(No Model.)

J. J. CRETSINGER.
ROAD CART.

No. 502,281. Patented Aug. 1, 1893.

Witnesses
A. L. Hobbie
N. L. Lindop

Inventor
John J. Cretsinger
By Thos. S. Sprague & Son
Attys.

UNITED STATES PATENT OFFICE.

JOHN J. CRETSINGER, OF DAVISON, MICHIGAN.

ROAD-CART.

SPECIFICATION forming part of Letters Patent No. 502,281, dated August 1, 1893.

Application filed November 16, 1891. Serial No. 411,975. (No model.)

*To all whom it may concern:*

Be it known that I, JOHN J. CRETSINGER, a citizen of the United States, residing at Davison, in the county of Genesee and State of Michigan, have invented certain new and useful Improvements in Road-Carts, of which the following is a specification, reference being had therein to the accompanying drawings.

This invention relates to new and useful improvements in road carts, and the invention consists in the peculiar construction of a cart in which the seat frame is rigidly secured to the thills, the axle connected to the thills by means of a hinged bar, embracing a spring section, and a spring interposed between the seat and the axles, with means on the axles for supporting the spring and adjusting its tension, all as more fully hereinafter described.

Figure 1:
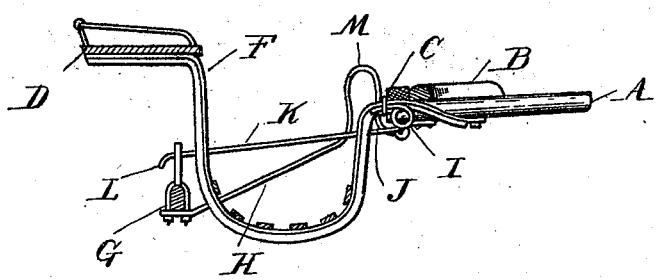
Figure 2:
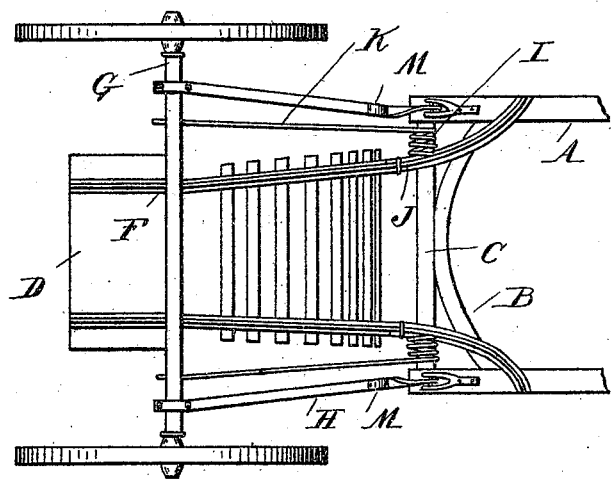

In the drawings, Figure 1 is a vertical, central, longitudinal section through a road cart embodying my invention. Fig. 2 is a bottom plan view thereof and Fig. 3 is a detached perspective view of a section of the axle showing the stepped frame for adjusting the tension of the spring.

A are the thills and B and C are the cross-bars at the rear end thereof.

D is the seat.

Figure 3:
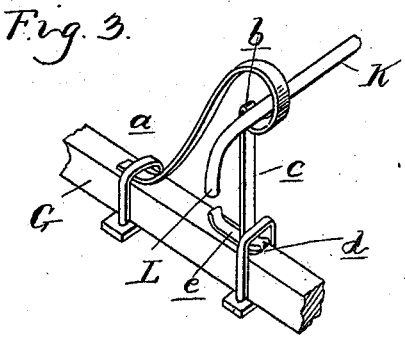

F are the seat bars suitably curved to form the usual seat rest and rigidly connected at their rear ends to the cross-bars or thills, as plainly shown in Fig. 3.

G is the axle.

H are rods secured at their rear ends to the axle, and at their forward ends having a hinged connection with the thills, this hinged connection being of any suitable construction.

I is a coiled spring having one arm J extending upwardly and secured to the side bars, and the other end K extending rearward and downward and resting upon the axle, being provided at its rear end with the hook L to prevent its disengagement therefrom, these parts being well known except as hereinafter described.

In carts of this character, no provision has heretofore been made for taking up the jerking motion due either to the quick starts of the horses, or to the back pull on the wheels when they enter a rut or hole in the road, and my invention has for its object the employment of an elastic connecting rod between the thills and the axle adapted to make the cart easier riding and better adapted for general use. The construction which I preferably employ in making the elastic connecting rod, is that shown in Figs. 1 and 2, consisting of a hinged portion or loop M formed by bending the connecting bar H into a spring loop. This I preferably arrange as near the thills as possible, so that it will not interfere with the exit and entrance to the seat. In constructing a cart of this kind with such an elastic connecting rod it is desirable to have the arm K of the spring slidingly engage with the axle, so that it will not interfere with the forward and backward motion of the axle in relation to the thills. In order that this sliding will not deface the axle and in order that it will be prevented from motion endwise of the axle as well as across the same, and at the same time permit of applying more or less tension to the spring, I preferably employ the construction shown in Fig. 3 for supporting the arm K of this frame and consisting of a stepped frame, formed of a single piece of metal, having an upwardly extending arm $a$ clipped at its lower end to the axle, with one or more hooks $b$ formed in the downwardly extending portion $c$, and the bend $d$ extending parallel with the axle and forming the means of securing the other end of the frame to the axle, a forwardly extending hook $e$ being formed upon the axle to support the rear end of the spring when in its lower position, the hook L preventing the disengagement of the spring from the axle in case too great a movement should occur between the axle and thills.

What I claim as my invention is—

1. In a road cart, the combination of the thills, the seat frame rigidly secured thereto, the axle, rods secured to the axle and hinged to the thills and having a spring section, substantially as and for the purpose described.

2. In a road cart, the combination of the thills, the seat frame rigidly secured thereto, the axle rods secured to the axle and hinged to the thills, a spring section in said braces, a spring on the seat frame, an arm of said spring supported on the axle and slidingly engaging therewith, substantially as and for the purpose described.

3. In a road cart, the combination of the thills, the seat frame rigidly secured thereto, the axle rod hinged to the thills and secured to the axles, a coil spring having one end secured to the seat frame and its other end extending above the axle, and a stepped frame on the axle for adjusting said arm vertically, substantially as described.

4. In a road cart, the combination with a seat frame rigidly secured to the thills, the axle, the rod connecting the axle with the thills hinged at its forward end and comprising a spring section, of a spring between the seat and the axle, the arm K of said spring, the stepped frame consisting of a single piece of metal formed with the hooks $b\ e$, the bend $d$, the arm $a$ and the clips for securing said frame to the axle, substantially as described.

In testimony whereof I affix my signature in presence of two witnesses.

JOHN J. CRETSINGER.

Witnesses:
M. B. O'DOGHERTY,
N. L. LINDOP.